United States Patent [19]

Brilando

[11] 4,293,141
[45] Oct. 6, 1981

[54] FRAME FOR LIGHTWEIGHT BICYCLE
[75] Inventor: Frank Brilando, Niles, Ill.
[73] Assignee: Schwinn Bicycle Company, Chicago, Ill.
[21] Appl. No.: 14,075
[22] Filed: Feb. 22, 1979
[51] Int. Cl.³ .................. B62K 3/04; B62K 19/06
[52] U.S. Cl. .................................. 280/281 R; 280/274
[58] Field of Search ........................... 280/281 R, 274

[56] References Cited
FOREIGN PATENT DOCUMENTS

| | | | |
|---|---|---|---|
| 889518 | 1/1944 | France | 280/281 R |
| 895046 | 1/1945 | France | 280/281 R |
| 7783 | of 1895 | United Kingdom | 280/281 R |
| 608223 | 4/1945 | United Kingdom | 280/281 R |

Primary Examiner—Joseph F. Peters, Jr.
Assistant Examiner—Donn McGiehan

[57] ABSTRACT

Frame for high performance light weight bicycle having round top and bottom tubes secured at forward ends to head tube, with forward ends of top and bottom tubes being oval with a lateral width the same as diameter of round portions as a minor axis, tapering rearwardly from a forward maximum major axis, and a section modulus gradually increasing from that of round portions toward the forward ends.

2 Claims, 9 Drawing Figures

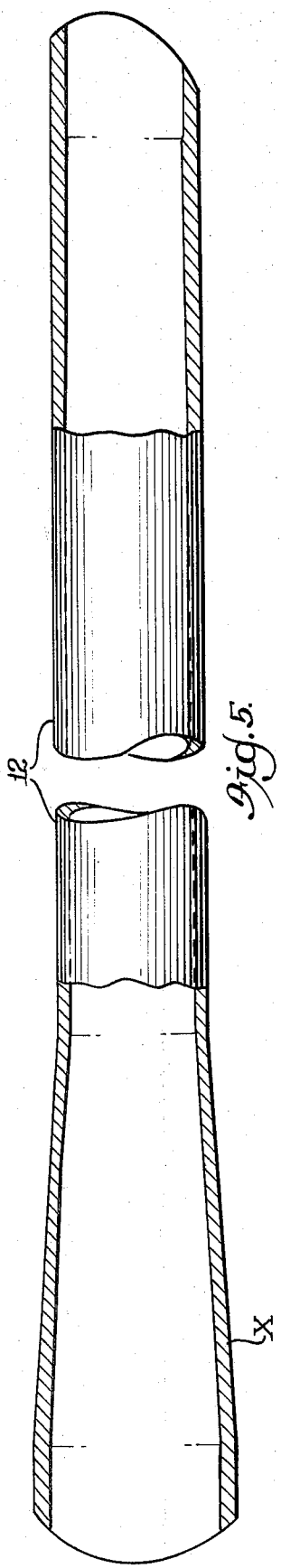
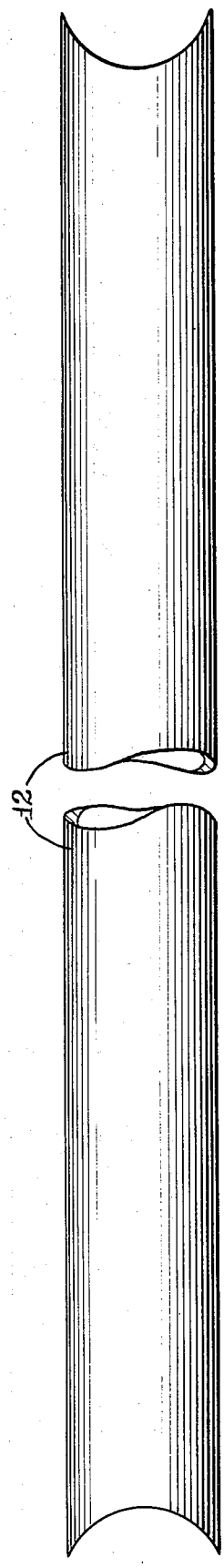
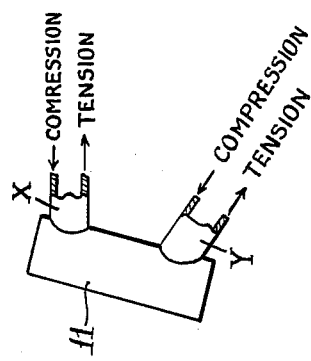
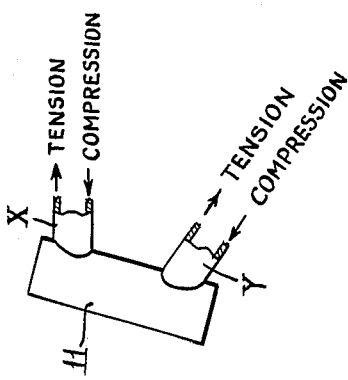
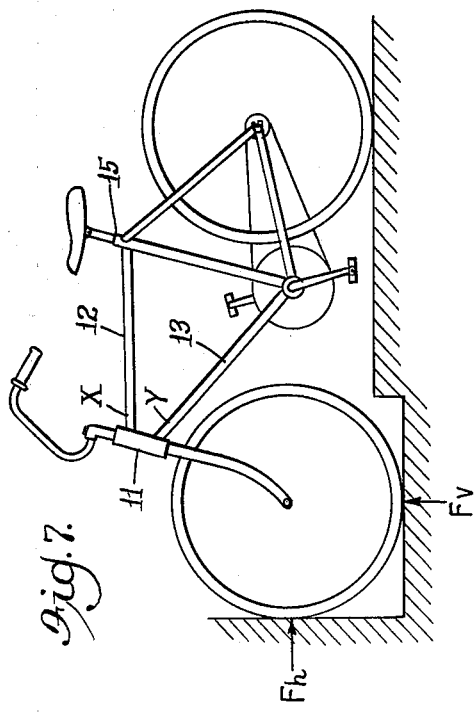

FRAME FOR LIGHTWEIGHT BICYCLE

BACKGROUND OF THE INVENTION

1. Field of the Invention

This invention relates generally to bicycles, and more particularly to high performance light weight bicycles expected to be subjected in off-road racing and the like to extreme and repeated frontal and drop off impacts against the front wheel, although it may be applicable to other bicycles, such as those intended primarily for street use.

2. Description of the Prior Art

Such prior art bicycles customarily employ a light weight frame in order to enable a rider to attain maximum speed, which includes a head tube 11, as shown in FIG. 7, and top and bottom tubes 12 and 13 secured at their forward ends thereto. When a frontal impact occurs, members 12 and 13 are most affected. Such impact is represented in FIG. 7 as force $F_h$ which imparts a bending force to members 12 and 13 that is most severe immediately rearward of their junctures with head tube 11 in the areas designated X and Y. Under such bending force, each of those members is subjected to a tensile strain on its upper portion and a compression strain on its lower portion as illustrated in FIG. 8.

When the bicycle is ridden over a drop off, force $F_v$ (FIG. 7) imparts a bending force to members 12 and 13 which is the reverse of that from $F_h$ so, as shown in FIG. 9, the upper portions in the areas X and Y are under a compressive strain and the lower portions thereof are subjected to a tensile strain.

Severe and numerous repetitions of such occurrences have caused failure of such light weight frames in the areas X and/or Y. While the incidence of failure may be reduced by adding a gusset adjacent those X, Y areas and secured to the members 11, 12 and 13, that merely shifts those highly stressed areas rearwardly and adds weight that is objectionable in high performance light weight bicycles.

SUMMARY OF THE INVENTION

This invention obviates the necessity of adding material weight to the frame of a light weight high performance bicycle while substantially eliminating frame failure from severe and repeated frontal and vertical loading by providing round top and bottom tubes, secured at their forward ends to the head tube, making those forward ends of the top and bottom tubes oval, with a lateral width as a minor axis the same as the diameter of the round portions, tapering said forward ends rearwardly from a maximum major axis adjacent the head tube and increasing the section modulus thereof gradually from that of the round portions toward the forward ends of those tubes.

In the drawings:

FIG. 5 is a vertical section taken longitudinally through the top tube of the frame;

FIG. 6 is a top plan view of that top tube; and

FIGS. 7-9 are diagrammatic views illustrating the effects of frontal and drop off forces on the top and bottom tubes of a bicycle frame.

DESCRIPTION OF THE PREFERRED EMBODIMENT

Figure 1:
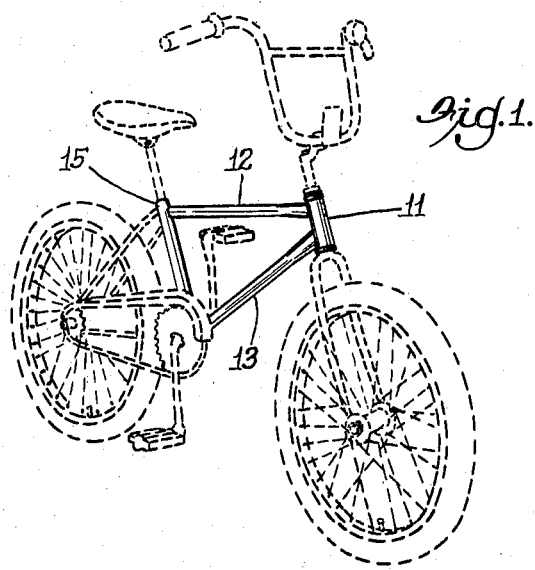
FIG. 1 is a perspective view of a bicycle in broken lines incorporating in full lines a frame embodying the invention.

Referring to FIG. 1, a bicycle incorporating the frame embodying this invention is shown in broken lines as including conventional wheels, forks, driving gear, seat and handlebar, and a frame in full lines comprising a head tube 11, top tube 12, bottom tube 13, gear hanger 14 (FIG. 2) and seat mast 15.

Figure 3:
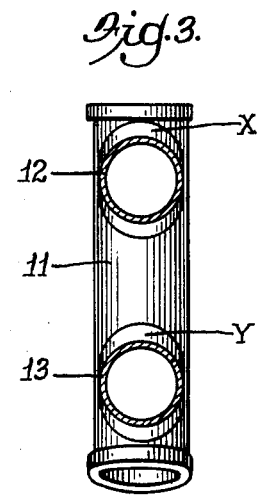
FIG. 3 is a transverse section taken substantially on line 3—3 of FIG. 2.
Figure 2:
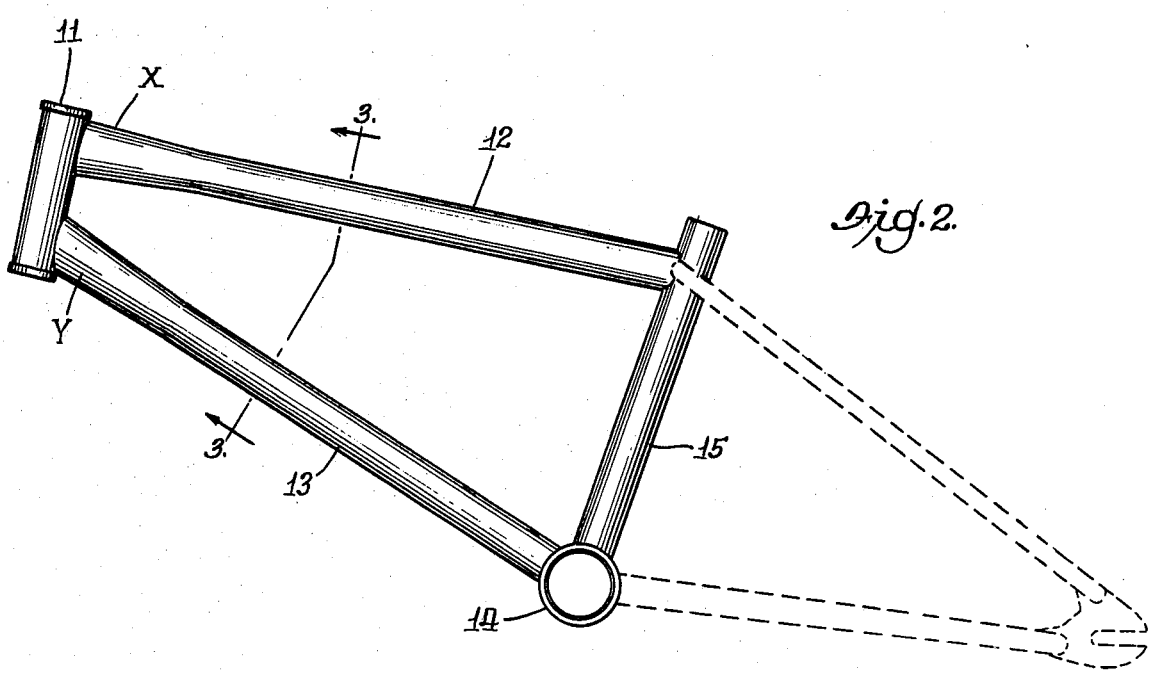
FIG. 2 is an elevational view of the frame of FIG. 1.
Figure 4:
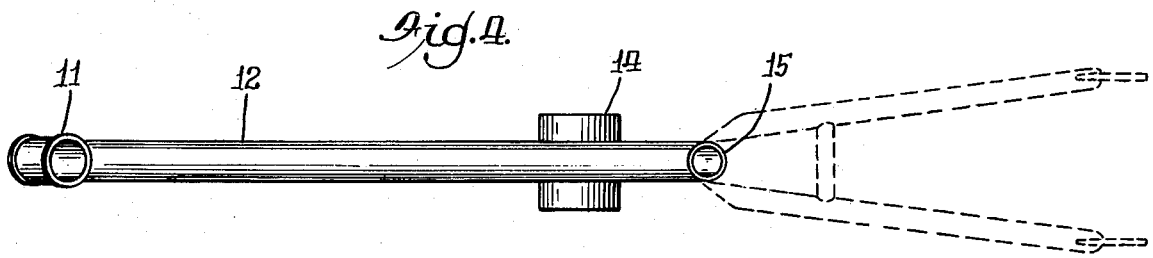
FIG. 4 is a top plan view of the frame of FIG. 2.

The specific points of novelty of this frame are that the top and bottom tubes 12 and 13, which are circular or round in cross section for the major portion of their lengths, are oval in cross section at their forward ends in their highly stressed areas X and Y (FIG. 2). As best seen in FIGS. 3 and 4, the minor axis of each of the oval portions X and Y of tubes 12 and 13 is substantially equal to the diameter of their round portions. Thus, in plan as shown in FIGS. 4 and 6, the lateral width of each of these tubes is uniform throughout its length. And as seen in FIGS. 2, 3 and 5, the oval forward end portions X and Y taper from a maximum major axis at the end, or point of connection to the head tube 11, rearwardly into convergence with the main round portions of these tubes. At the same time, the section modulus or thickness of each of the oval portions X and Y gradually increases from that of the round portions toward the forward ends of tubes 12 and 13, as shown for the tube 12 in FIG. 5. The oval and tapered portions X and Y thus provide an efficient utilization of material and result in lower tensil and compressive stresses in the high stressed areas. The round portions of the tubes 12 and 13 resist torsion and, having a smaller section modulus, will absorb energy from the vertical and frontal forces $F_v$ and $F_h$ previously referred to, thereby reducing the stress level in areas X and Y.

As best seen in FIGS. 5 and 6, the ends of the top tube 12 are cut or milled on an appropriate radius to conform to the outer surfaces of the head tube 11 and seat mast 15, respectively, and are rigidly secured thereto. Such may be accomplished in any well known manner, as by fillet brazing, for example. The ends of bottom tube 13 preferably are similarly secured, respectively, to the head tubes 11 and the hanger 14.

By providing the ovalized and tapered forward end portions X and Y on the top and bottom tubes 12 and 13, a greatly improved frame for high performance light weight bicycles results which will successfully resist severe and repeated frontal and drop off impacts against the front wheel without adding materially to the weight of the frame.

I claim:

1. A frame for a high performance light weight bicycle, comprising a head tube, and top and bottom tubes having their forward ends secured to said head tube and extending rearwardly therefrom, with the major portions of said top and bottom tubes being round, and the forward end portions thereof being oval with a lateral width the same as the diameter of said round portions as a minor axis and tapering rearwardly from a maximum major axis adjacent said head tube.

2. A frame according to claim 1, wherein the section modulus of each of the oval portions of said top and bottom tubes gradually increases from that of the round portions thereof toward the forward ends of said tubes.

* * * * *